(12) United States Patent
Moeller

(10) Patent No.: US 8,287,334 B2
(45) Date of Patent: Oct. 16, 2012

(54) SPINDLE WITH DRAW ROD AND CURRENT CONDUCTOR

(75) Inventor: Bernd Moeller, Hersbruck (DE)

(73) Assignee: Paul Mueller GmbH & Co. KG Unternehmensbeteiligungen, Nuremberg (DE)

( * ) Notice: Subject to any disclaimer, the term of this patent is extended or adjusted under 35 U.S.C. 154(b) by 708 days.

(21) Appl. No.: 12/308,155

(22) PCT Filed: Jun. 14, 2007

(86) PCT No.: PCT/DE2007/075005
§ 371 (c)(1),
(2), (4) Date: Jul. 22, 2009

(87) PCT Pub. No.: WO2008/019683
PCT Pub. Date: Feb. 21, 2008

(65) Prior Publication Data
US 2010/0015897 A1    Jan. 21, 2010

(30) Foreign Application Priority Data
Jun. 14, 2006   (EP) .................................... 06012224

(51) Int. Cl.
*B24B 55/02* (2006.01)

(52) U.S. Cl. ........................................ 451/294; 451/450
(58) Field of Classification Search .................. 451/541, 451/548, 294, 450
See application file for complete search history.

(56) References Cited

U.S. PATENT DOCUMENTS

| | | | |
|---|---|---|---|
| 4,674,235 A * | 6/1987 | Inoue | 451/28 |
| 5,006,685 A | 4/1991 | Hatano et al. | |
| 5,078,256 A | 1/1992 | Hatano et al. | |

FOREIGN PATENT DOCUMENTS

| | | |
|---|---|---|
| DE | 33 12 604 | 10/1984 |
| DE | 38 26 277 | 2/1989 |
| DE | 102 21 430 | 7/2003 |

OTHER PUBLICATIONS

International Search Report.

* cited by examiner

*Primary Examiner* — Robert Rose
(74) *Attorney, Agent, or Firm* — Collard & Roe, P.C.

(57) ABSTRACT

The invention relates to a spindle (1) for a machine tool, in particular a motor spindle, with a housing (2) for accommodating an electric motor (3) and a shaft (4) that can be driven by the latter, and with a tool holder (5) for a tool (6) that can be electrically connected, wherein a draw rod (7) is provided for actuating the tool holder (5) of the spindle (1) and wherein the draw rod (7) has a current conductor (8) for supplying current to a held tool (6).

Figure 1:
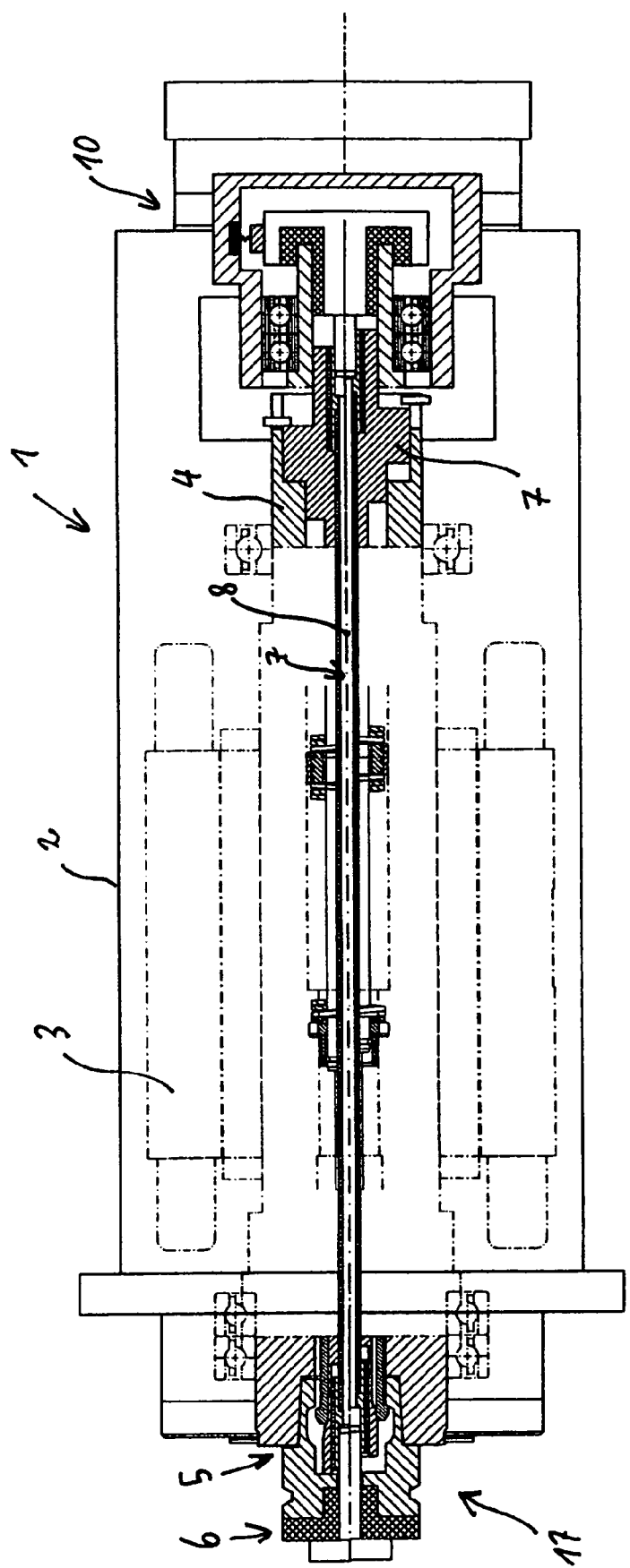

6 Claims, 3 Drawing Sheets

SPINDLE WITH DRAW ROD AND CURRENT CONDUCTOR

CROSS REFERENCE TO RELATED APPLICATIONS

This application is the National Stage of PCT/DE2007/075005 filed on Jun. 14, 2007, which claims priority under 35 U.S.C. §119 of European Application No. 06012224.9 filed Jun. 14, 2006. The international application under PCT article 21(2) was not published in English.

The invention relates to a spindle for a machine tool having the features of the preamble of claim 1.

DE 102 21 430 C1 discloses a spindle arrangement for rotationally drivable, electrically connectable tools, e.g. for grinding or electrical discharge machining, there being a spindle sleeve and a spindle core electrically insulated therefrom. A device for automated tool change is not provided in this case.

The object of the invention is to offer a machine tool for rotationally drivable, electrically connectable tools, in which machine tool an automated tool change is made possible.

This object is achieved by a spindle having the features of the characterizing part of patent claim 1 in conjunction with the features of the preamble of patent claim 1.

Advantageous embodiments are described in subclaims 2 to 6.

The spindle according to the invention has a draw rod for actuating the automatic tool holder of the spindle, wherein the draw rod furthermore has a current conductor for supplying current to a held tool. A current conductor is therefore accommodated in or attached to the draw rod for actuating the automatic tool holder. The draw rod therefore serves as a carrier or fastening base for the current conductor used.

According to an advantageous embodiment, the draw rod is in this case designed as a hollow shaft having a cavity, wherein the current conductor is in particular accommodated or attached in the cavity of the hollow shaft. In this case, the cavity of the draw rod can be used firstly to accommodate the current conductor and secondly to feed coolant.

The draw rod in this case advantageously has a first end region which is supplied with current by a transfer element for supplying current to the current conductor. The current conductor can therefore be supplied with current inside or at the draw rod via this end region.

In this case, the first end region of the spindle is axially displaceable relative to the draw rod. In different positions of the draw rod, e.g. when mounting the tool or when releasing the tool, the draw rod can therefore assume different axial positions relative to the end region of the spindle.

According to a further advantageous embodiment, the draw rod has a second end region which is insulated from a base region of the accommodated tool. This prevents the base region of the tool from being undesirably supplied with current.

Figure 2:
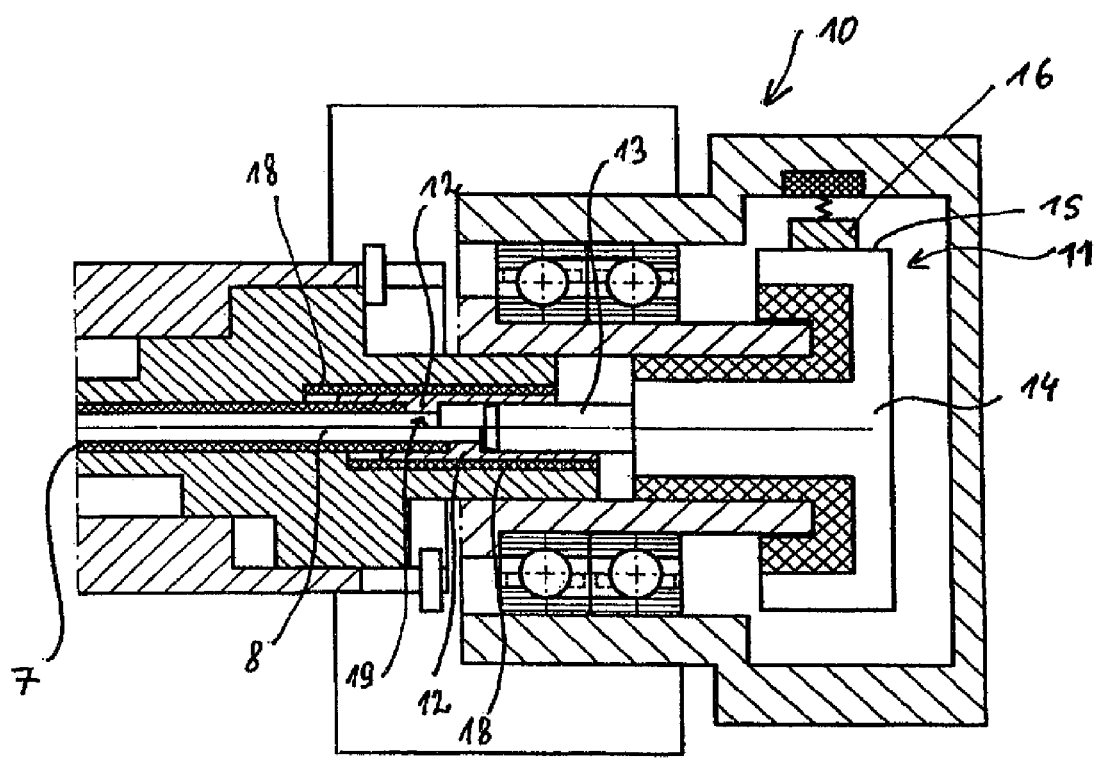
Figure 4:
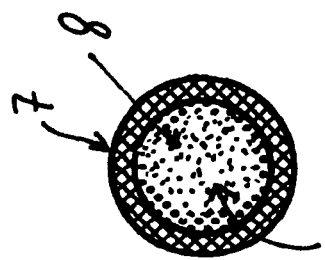
Figure 5:
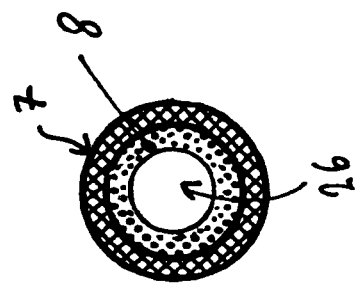
Figure 3:
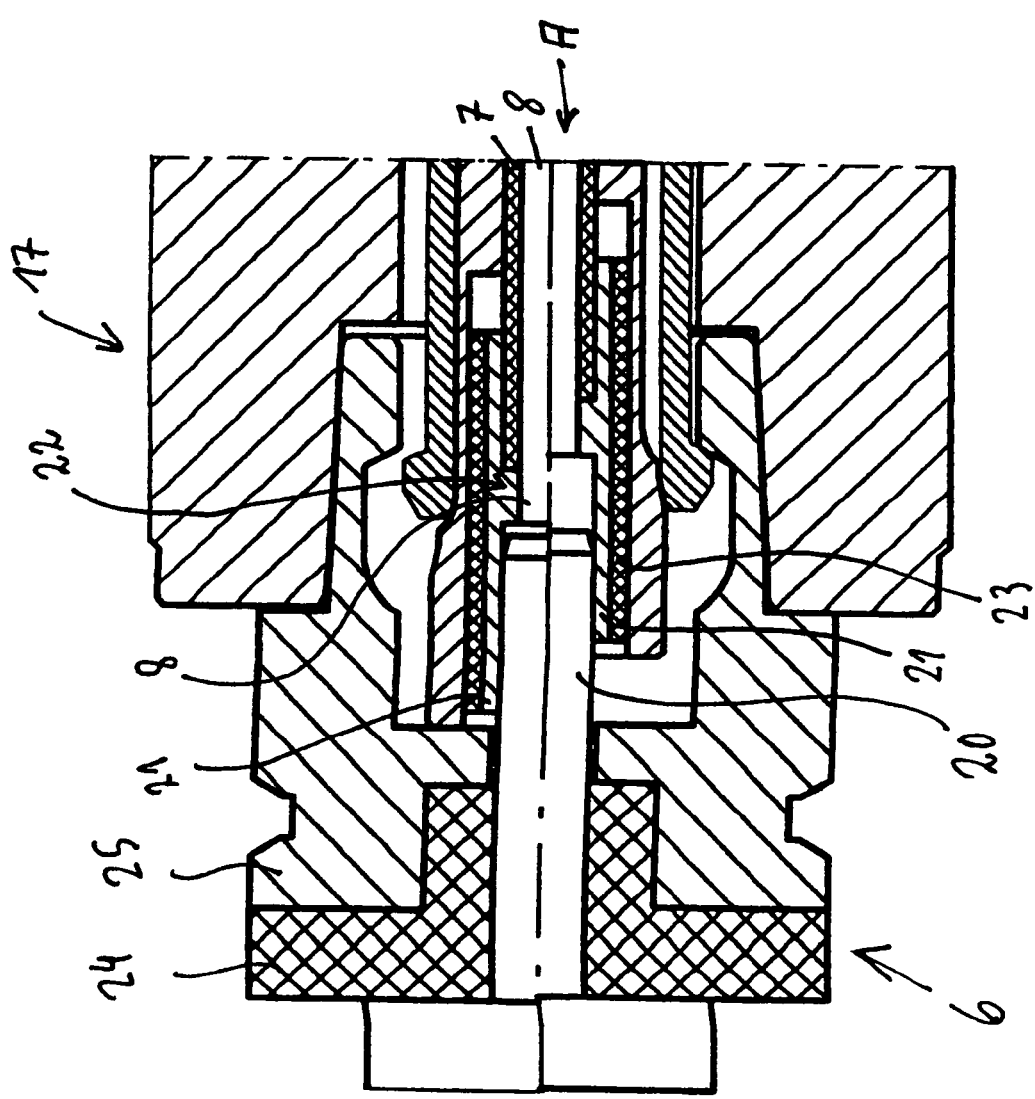

The spindle according to the invention is explained in more detail with reference to exemplary embodiments in the figures of the drawing, in which:

FIG. 1 shows a sectional illustration through a spindle, the draw rod being depicted in an extended position in a first top partial section and in a retracted position in a bottom partial section, FIG. 2 shows an enlarged illustration of a first end region of the spindle according to FIG. 1, FIG. 3 shows an enlarged illustration of a second end region of the spindle according to FIG. 1, FIG. 4 shows a view A in FIG. 3 of a first embodiment of the draw rod, and FIG. 5 shows a view A in FIG. 3 of a further embodiment of the draw rod.

FIG. 1 shows a spindle 1 having a housing 2 and an electric motor 3 accommodated therein for driving a shaft 4. Furthermore, a tool holder 5 is provided in which, as depicted, a tool 6, in particular an electrically connectable tool 6, is accommodated. A draw rod 7 for the automatic tool change is accommodated in the spindle 1 and has a current conductor 8 for supplying current to the tool 6.

FIG. 2 shows a first end region 10 in an enlarged illustration of the spindle 1 according to FIG. 1.

A position of the draw rod 7 in the extended position can be seen from FIG. 2—as in FIG. 1—in a first partial sectional illustration above the center line, wherein the tool 6 can then be removed from the tool holder 5.

Below the center line, the draw rod 7 is shown in a retracted position, in which, according to the illustration, the tool 6 is taken hold of in the accommodated and locked position in the second end region 17 according to FIG. 1 and FIG. 3.

The draw rod 7 is formed from an insulating material or is coated therewith and has a conductive element 12 in which a pin 13 of a first end part 14 engages. Current conducted into the first end part 14 is conducted via the pin 13 and the conductive element 12 into the current conductor 8. There, the current is conducted further over the entire length of the draw rod 7 into the second end region 17 and can be fed there to the accommodated electrically connectable tool 6.

In this case, the current conductor 8, for the current transfer, makes contact with the conductive element 12 with its section 19 and may at the same time be fixedly connected to the conductive element 12 (e.g. by a soldered connection).

The first end part 14 has a transfer element 11 having an outer region 15 which can be brought into contact via a brush element 16 and also enables current conducted into the brush element 16 to be transferred into the first end part 14 during rotation of the first end part 14 relative to the stationary brush element 16. The draw rod 7 has an insulating part 18 for insulating the draw rod 7 relative to the conductive element 12.

The brush element 16 can be lifted during operation without current transfer, such that in this case no restriction of the spindle speed due to the max. circumferential velocity at the brush element 16 has to be taken into account (e.g. for high speeds during grinding).

In addition, contact separation within the spindle can be achieved as a result, such that, for example, a safe tool change by hand is possible.

The brush element 16 can be lifted by a lifting device (not depicted) (e.g. electromagnetically, hydraulically, pneumatically or also by hand).

Advantageous for safety reasons is a solution in which the brush element 16, in the state in which the lifting device is not actuated, is lifted from the outer region 15, for example, by further spring elements (not depicted).

A further current transfer to the tool takes place in the second end region 17 between the pin 20 and a further conductive element 21 and the current conductor 8. In this case, the current conductor 8, for the current transfer, makes contact with the further conductive element 21 with a further section 22 and may at the same time be likewise fixedly connected to the further conductive element 21 (e.g. a soldered connection). The draw rod 7 has a further insulating part 23 for insulating the draw rod 7 relative to the further conductive element 21.

The current from the current conductor 8 is therefore conducted into the pin 20 of the tool 6, e.g. for grinding or electrical discharge machining.

In this case, the pin 20 is in turn electrically separated from the currentless base region 25 of the tool 6 by an insulation 24.

Shown in view A according to FIG. 4 is a draw rod 7 which has the current conductor 8 in the inner cavity, said current conductor 8 being designed as a rod or tube (e.g. made of copper).

According to a further advantageous embodiment of the draw rod 7 according to FIG. 5, the current conductor 8 is designed as a tube and has in the interior a further hollow region 26, which can be used, for example, for feeding coolant for the machining of the workpiece.

In such an embodiment, the spindle 1 according to the invention can be used firstly during use with electrically connectable tool 6 without coolant feed and secondly, if need be with current switched off, with feeding of coolant through the further hollow region 26 of the draw rod 7, e.g. for turning or milling without electrically connectable tools and with conventional cutting or grinding tools.

DESIGNATIONS

1 Spindle
2 Housing
3 Electric motor
4 Shaft
5 Tool holder
6 Tool
7 Draw rod
8 Current conductor
9 Cavity
10 First end region
11 Transfer element
12 Conductive element
13 Pin
14 End part
15 Outer region
16 Brush element
17 Second end region
18 Insulating part
19 Section
20 Pin
21 Further conductive element
22 Further section
23 Further insulating part
24 Insulation
25 Base region
26 Hollow region

The invention claimed is:

1. A spindle (1) for a machine tool, the spindle having a housing (2) for accommodating an electric motor (3) and a shaft (4) which can be driven by the electric motor, and having a tool holder (5) for an electrically connectable tool (6), wherein a draw rod (7) is provided for actuating the tool holder (5) of the spindle (1), wherein the draw rod (7) has a current conductor (8) for supplying current to a held tool (6).

2. The spindle as claimed in claim 1, wherein the draw rod (7) is designed as a hollow shaft having a cavity (9).

3. The spindle as claimed in claim 2, wherein the current conductor (8) is accommodated in the cavity (9).

4. The spindle as claimed in claim 1, wherein the draw rod (7) has a first end region (10) which is supplied with current by a transfer element (11) for supplying current to the current conductor (8).

5. The spindle as claimed in claim 4, wherein the first end region (10) of the spindle (1) and the draw rod (7) are axially displaceable relative to one another.

6. The spindle as claimed in claim 1, wherein the draw rod (7) has a second end region (17) which is insulated from a base region (25) of the accommodated tool (6).

* * * * *